United States Patent
Xie et al.

(10) Patent No.: US 12,002,386 B2
(45) Date of Patent: Jun. 4, 2024

(54) ELECTRONIC LABEL AND MONITORING METHOD, DEVICE AND SYSTEM THEREOF

(71) Applicants: Chongqing BOE Smart Electronics System Co., Ltd., Chongqing (CN); BOE Technology Group Co., Ltd., Beijing (CN)

(72) Inventors: Yunyan Xie, Beijing (CN); Bo Liu, Beijing (CN); Lichun Chen, Beijing (CN)

(73) Assignees: Chongqing BOE Smart Electronics System Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 675 days.

(21) Appl. No.: 17/269,540

(22) PCT Filed: Jul. 27, 2020

(86) PCT No.: PCT/CN2020/104872
§ 371 (c)(1),
(2) Date: Feb. 19, 2021

(87) PCT Pub. No.: WO2021/052007
PCT Pub. Date: Mar. 25, 2021

(65) Prior Publication Data
US 2021/0390885 A1 Dec. 16, 2021

(30) Foreign Application Priority Data
Sep. 18, 2019 (CN) .......................... 201910882238.4

(51) Int. Cl.
*G09F 3/20* (2006.01)
*G08B 21/18* (2006.01)
(Continued)

(52) U.S. Cl.
CPC ............ *G09F 3/208* (2013.01); *G08B 21/185* (2013.01); *G09G 3/16* (2013.01); *H02J 7/00304* (2020.01);
(Continued)

(58) Field of Classification Search
CPC ........ G09F 3/208; G08B 21/185; G09G 3/16; G09G 2330/021; G09G 2380/04; G09G 3/20; H02J 7/00304; H02J 7/0063
See application file for complete search history.

(56) References Cited

U.S. PATENT DOCUMENTS 7,583,180 B2    9/2009  Sato
2008/0278136 A1  11/2008  Murtojarvi
(Continued)

FOREIGN PATENT DOCUMENTS

CN    101689806 A    3/2010
CN    102938569 A    2/2013
(Continued)

OTHER PUBLICATIONS

International Search Report for PCT/CN2020/104872 dated Oct. 28, 2020.
(Continued)

*Primary Examiner* — Ryan W Sherwin
(74) *Attorney, Agent, or Firm* — Ling Wu; Stephen Yang; Ling and Yang Intellectual Property

(57) ABSTRACT

An electronic label is provided, including: a first power supply unit, which is configured to supply power to the electronic label; a first control unit, which is configured to monitor at least one of a power supply voltage and a remaining power of the first power supply unit. The first power supply unit includes a first booster circuit, and is configured to turn on the first booster circuit to boost the power supply voltage when at least one of the following
(Continued)

conditions is met: the power supply voltage is lower than a first preset voltage threshold; and, the remaining power is lower than a first preset power threshold. The invention also provides a method for monitoring an electronic label, an electronic label monitoring device, and an electronic label system.

14 Claims, 6 Drawing Sheets

(51) Int. Cl.
    *G09G 3/16* (2006.01)
    *H02J 7/00* (2006.01)

(52) U.S. Cl.
    CPC ...... *H02J 7/0063* (2013.01); *G09G 2330/021* (2013.01); *G09G 2380/04* (2013.01)

(56) References Cited

U.S. PATENT DOCUMENTS

| | | | | |
|---|---|---|---|---|
| 2012/0169585 | A1* | 7/2012 | Kim | G09F 3/208 |
| | | | | 345/156 |
| 2014/0292107 | A1 | 10/2014 | Cho et al. | |
| 2015/0311831 | A1 | 10/2015 | Yamada et al. | |
| 2019/0171402 | A1* | 6/2019 | Ishizaki | G06Q 20/201 |
| 2019/0265773 | A1* | 8/2019 | Sjödin | G06F 1/28 |
| 2019/0339921 | A1* | 11/2019 | Dix | G06Q 30/02 |

FOREIGN PATENT DOCUMENTS

| | | |
|---|---|---|
| CN | 104102940 A | 10/2014 |
| CN | 104769827 A | 7/2015 |
| CN | 107579563 A | 1/2018 |
| CN | 107643493 A | 1/2018 |
| CN | 110601294 A | 12/2019 |
| JP | 2002-234407 A | 8/2002 |

OTHER PUBLICATIONS

Office Action dated Aug. 27, 2020 for Chinese Patent Application No. 201910882238.4 and English Translation.

Office Action dated Apr. 6, 2021 for Chinese Patent Application No. 201910882238.4 and English Translation.

\* cited by examiner

ELECTRONIC LABEL AND MONITORING METHOD, DEVICE AND SYSTEM THEREOF

The present application claims the priority of Chinese patent application No. 201910882238.4, filed to the CNIPA on Sep. 18, 2019 and entitled "Electronic Label and Monitoring Method, Device and System Thereof", the content of which should be regarded as being incorporated into the present application by reference.

TECHNICAL FIELD

The embodiment of the disclosure relates to, but is not limited to, the field of display technology, in particular to an electronic label and a monitoring method, device and system thereof.

BACKGROUND

Electronic shelf label (ESL) is also known as electronic price label. Compared to a traditional paper label, an electronic shelf label is more time-efficient when being used to change product information uniformly, because the product information change is performed mainly through unified computer backstage management, product information change errors occurred under manual changes can be avoided. Due to their high efficiency and intelligence, electronic price labels are gradually replacing paper price labels in places where labels are used intensively, such as shopping malls, supermarkets, logistics and warehousing.

Mostly, electronic labels are made of electronic papers. Because the reflective display characteristic of the electronic papers, i.e. the low power consumption characteristic of maintaining the original display when in standby state, electronic labels become a product of low power consumption. An electronic label is powered by a battery (e.g. 2 button cells) during a price update, and the battery stops supplying power after the update is complete, then the electronic paper display the updated picture using the reflective principle. However, on the one hand, there may be a potential problem of an update failure during the updating process due to insufficient battery power, which affects the proper display of product information. On the other hand, with the extensive and widespread use scenarios of electronic price labels, the frequency of daily updates of the electronic price labels may also raise gradually. For example, the button cell with model CR2450 is expected to serve five years with four daily update operations. Yet, as the frequency of updates increases, it becomes difficult for two button cells to meet the demand of a well-working service time of five years.

SUMMARY

The following is a summary of subject matter described in detail herein. This summary is not intended to limit the protection scope of the claims.

Embodiments of the disclosure provide an electronic label and a monitoring method, device and system thereof.

In a first aspect, an embodiment of the present disclosure provides an electronic label, including: a first power supply unit, which is configured to supply power to the electronic label; and a first control unit, which is configured to monitor at least one of a power supply voltage and a remaining power of the first power supply unit; wherein, the first power supply unit includes a first booster circuit, and the first control unit is configured to turn on the first booster circuit to boost the power supply voltage when at least one of the following conditions is met: the power supply voltage is lower than a first preset voltage threshold; and the remaining power is lower than a first preset power threshold.

In an exemplary embodiment, the electronic label further comprising a first alarm unit, wherein the first control unit is further configured to send a first alarm instruction to the first alarm unit when at least one of the following conditions is met: the power supply voltage is lower than a first preset voltage threshold; and the remaining power is lower than a first preset power threshold; the first alarm unit is configured to receive the first alarm instruction and output first alarm information.

In an exemplary embodiment, the first control unit is further configured to: acquire information of current remaining power and usage status information of the electronic label; calculate expected remaining power according to the usage status information and power consumption corresponding to the usage status information; compare the current remaining power with the expected remaining power; and send a second alarm instruction to the first alarm unit when a power difference between the current remaining power and the expected remaining power is greater than a preset power difference threshold, wherein the first alarm unit is further configured to receive the second alarm instruction and output second alarm information.

In an exemplary embodiment, the usage status information comprises update frequency of the electronic label and service time of the electronic label, and the power consumption corresponding to the usage status information comprises power consumption for update and power consumption per unit time.

In an exemplary embodiment, the first control unit is further configured to send a third alarm instruction to the first alarm unit when at least one of the following conditions is met: the power supply voltage is lower than a second preset voltage threshold; and the remaining power is lower than a second preset power threshold; the first alarm unit is further configured to receive the third alarm instruction and output third alarm information.

In an exemplary embodiment, the first booster circuit is a DC converter booster circuit.

In a second aspect, an embodiment of the present disclosure provides a method for monitoring an electronic label, including: monitoring at least one of the power supply voltage and the remaining power of the electronic label; boosting the power supply voltage when at least one of the following conditions is met: the power supply voltage is lower than a first preset voltage threshold; and the remaining power is lower than a first preset power threshold.

In an exemplary embodiment, the method further comprising: outputting first alarm information when at least one of the following conditions is met: the power supply voltage is lower than the first preset voltage threshold; and the remaining power is lower than the first preset power threshold.

In an exemplary embodiment, the method further comprising: acquiring information of current remaining power and usage status information of the electronic label; calculating expected remaining power according to the usage status information and power consumption corresponding to the usage status information; comparing the current remaining power with the expected remaining power; and outputting second alarm information when a power difference between the current remaining power and the expected remaining power is greater than a preset power difference threshold.

In an exemplary embodiment, the method the usage status information comprises update frequency of the electronic label and service time of the electronic label, and the power consumption corresponding to the usage status information comprises power consumption for update and power consumption per unit time.

In an exemplary embodiment, the method further comprising: outputting third alarm information when at least one of the following conditions is met: the power supply voltage is lower than a second preset voltage threshold; and the remaining power is lower than a second preset power threshold.

In a third aspect, an embodiment of the present disclosure provides an electronic label, including: a second power supply unit, which is configured to supply power to the electronic label; a second control unit, which is configured to monitor at least one of the power supply voltage and the remaining power of the second power supply unit; and a first transceiver unit, which is configured to report at least one of the power supply voltage and the remaining power to the electronic label monitoring device, and receive at least one of the comparison result between the power supply voltage and a third preset voltage threshold and the comparison result between the remaining power and a third preset power threshold; wherein, the second power supply unit includes a second booster circuit, and the second control unit is configured to turn on the second booster circuit to boost the power supply voltage when at least one of the following conditions is met: the power supply voltage is lower than a third preset voltage threshold; and the remaining power is lower than a third preset power threshold.

In an exemplary embodiment, the method further comprising a second alarm unit, wherein the second control unit is further configured to send a fourth alarm instruction to the second alarm unit when at least one of the following conditions is met: the power supply voltage is lower than the third preset voltage threshold; and the remaining power is lower than the third preset power threshold; the second alarm unit is configured to receive the fourth alarm instruction and output fourth alarm information.

In an exemplary embodiment, the first transceiver unit is further configured to report usage status information of the electronic label to the electronic label monitoring device and receive a comparison result between current remaining power and expected remaining power of the electronic label; the second control unit is further configured to send a fifth alarm instruction to the second alarm unit when a power difference between the current remaining power and the expected remaining power is greater than a preset power difference threshold; the second alarm unit is further configured to receive the fifth alarm instruction and output fifth alarm information.

In an exemplary embodiment, the usage status information comprises update frequency of the electronic label and service time of the electronic label, and power consumption corresponding to the usage status information comprises power consumption for update and power consumption per unit time.

In an exemplary embodiment, the first transceiver unit is further configured to receive at least one of a comparison result between the power supply voltage and a fourth preset voltage threshold and a comparison result between the remaining power and a fourth preset power threshold; the second control unit is further configured to send a sixth alarm instruction to the second alarm unit when at least one of the following conditions is met: the power supply voltage is lower than the fourth preset voltage threshold; and, the remaining power is lower than the fourth preset power threshold; the second alarm unit is further configured to receive the sixth alarm instruction and output sixth alarm information.

In an exemplary embodiment, the second booster circuit is a DC converter booster circuit.

In a fourth aspect, an embodiment of the present disclosure provides a method for monitoring power supply for an electronic label, including: monitoring at least one of the power supply voltage and the remaining power of the electronic label; reporting at least one of the power supply voltage and the remaining power to the electronic label monitoring device; receiving at least one of the comparison result between the power supply voltage and a third preset voltage threshold and the comparison result between the remaining power and a third preset power threshold; boosting the power supply voltage when at least one of the following conditions is met: the power supply voltage is lower than a third preset voltage threshold; and the remaining power is lower than a third preset power threshold.

In an exemplary embodiment, the method further comprising: outputting fourth alarm information when at least one of the following conditions is met: the power supply voltage is lower than the third preset voltage threshold; and the remaining power is lower than the third preset power threshold.

In an exemplary embodiment, the method further comprising: reporting usage status information of the electronic label to the electronic label monitoring device; receiving a comparison result between current remaining power and expected remaining power of the electronic label; and outputting fifth alarm information when a power difference between the current remaining power and the expected remaining power is greater than a preset power difference threshold.

In an exemplary embodiment, the usage status information comprises update frequency of the electronic label and service time of the electronic label, and power consumption corresponding to the usage status information comprises power consumption for update and power consumption per unit time.

In an exemplary embodiment, the method further comprising: receiving at least one of a comparison result between the power supply voltage and a fourth preset voltage threshold and a comparison result between the remaining power and a fourth preset power threshold; and outputting sixth alarm information when at least one of the following conditions is met: the power supply voltage is lower than the fourth preset voltage threshold; and the remaining power is lower than the fourth preset power threshold.

In a fifth aspect, an embodiment of the present disclosure provides an electronic label monitoring device, comprising: a second transceiver unit, which is configured to receive at least one of the power supply voltage and the remaining power of the electronic label, and send at least one of the comparison result between the power supply voltage and a third preset voltage threshold and the comparison result between the remaining power and a third preset power threshold to the electronic label; and a third control unit, which is configured to call at least one of the third preset voltage threshold and the third preset power threshold, and compare at least one of the following two sets of values to obtain a comparison result: between the power supply voltage and the third preset voltage threshold, and between the remaining power and the third preset power threshold.

In an exemplary embodiment, the second transceiver unit is further configured to receive usage status information of the electronic label and send a comparison result between current remaining power and expected remaining power to the electronic label; the third control unit is further configured to calculate the expected remaining power according to the usage status information of the electronic label and a power consumption corresponding to the usage status information, and to compare the current remaining power with the expected remaining power to obtain the comparison result.

In an exemplary embodiment, the usage status information comprises update frequency of the electronic label and service time of the electronic label, and the power consumption corresponding to the usage status information comprises power consumption for update and power consumption per unit time.

In an exemplary embodiment, the third control unit is further configured to call at least one of a fourth preset voltage threshold and a fourth preset power threshold, and compare at least one of the following two sets of values to obtain a comparison result: between the power supply voltage and the fourth preset voltage threshold, and between the remaining power and the fourth preset power threshold; the second transceiver unit is further configured to send at least one of the comparison result between the power supply voltage and the fourth preset voltage threshold and the comparison result between the remaining power and the fourth preset power threshold to the electronic label.

In a sixth aspect, an embodiment of the present disclosure provides a method for monitoring an electronic label, including: receiving at least one of the power supply voltage and the remaining power of the electronic label; calling at least one of a third preset voltage threshold and a third preset power threshold; comparing at least one of the following two sets of values to obtain a comparison result: between the power supply voltage and the third preset voltage threshold, and between the remaining power and the third preset power threshold; sending at least one of the comparison result between the power supply voltage and a third preset voltage threshold and the comparison result between the remaining power and the third preset power threshold to the electronic label.

In an exemplary embodiment, the method further comprising: receiving usage status information of the electronic label; calculating expected remaining power according to the usage status information and power consumption corresponding to the usage status information; comparing current remaining power with the expected remaining power to obtain a comparison result; sending the comparison result between the current remaining power and the expected remaining power to the electronic label.

In an exemplary embodiment, the usage status information comprises update frequency of the electronic label and service time of the electronic label, and the power consumption corresponding to the usage status information comprises power consumption for update and power consumption per unit time.

In an exemplary embodiment, the method further comprising: calling at least one of a fourth preset voltage threshold and a fourth preset power threshold; comparing at least one of the following two sets of values to obtain comparison results: between the power supply voltage and the fourth preset voltage threshold, and between the remaining power and the fourth preset power threshold; sending at least one of the comparison result between the power supply voltage and the fourth preset voltage threshold and the comparison result between the remaining power and the fourth preset power threshold to the electronic label.

In a seventh aspect, an embodiment of the present disclosure provides an electronic label system, comprising: at least one electronic label; and the electronic label monitoring device.

In the eighth aspect, an embodiment of the present disclosure also provides a computer readable storage medium, storing computer executable instructions for implementing the method for monitoring an electronic label.

On the ninth aspect, an embodiment of the present disclosure also provides an electronic label monitoring device, which includes a memory, a processor and a computer program stored in the memory and executed on the processor, and the abovementioned steps in the method for monitoring an electronic label are achieved when the processor executes the program.

Other aspects will become apparent upon reading and understanding accompanying drawings and the detailed description.

BRIEF DESCRIPTION OF DRAWINGS

In order to better explain the technical schemes of the embodiments of the present disclosure, the accompanying drawings of the embodiments will be briefly introduced below. The following accompanying drawings only relate to some embodiments of the present disclosure, while they do not constitute a limitation on the present disclosure.

DETAILED DESCRIPTION

The following will clearly and completely describe the technical solution of the embodiments of the present invention with reference to the drawings of the embodiments of the present disclosure. The described embodiments are some of the embodiments of the present disclosure, rather than all of the embodiments. Based on the described embodiments of the present disclosure, all other embodiments obtained by those of ordinary skills in the art without creative work are covered by the scope of protection of the present disclosure.

Unless otherwise defined, technical terms or scientific terms used in the present disclosure shall have the ordinary meaning understood by those with ordinary skills in the art to which the present disclosure pertains. The words "first", "second" and the like used in the present disclosure do not represent any order, quantity or importance, but are only used to distinguish different components. Similarly, similar words such as "a", "an" or "the" do not denote a limitation on quantity, but rather denote the presence of at least one. Words such as "comprising", "including", or the like, mean that the elements or articles preceding the word cover elements or articles listed after the word and their equivalents, and do not exclude other elements or articles. Words such as "connected", "linked" or the like are not limited to physical or mechanical connections, but may include electrical connections, whether direct or indirect. "Up", "down", "left", "right" and the like are merely used to indicate a relative positional relationship. Upon the change of an absolute position of a described object, the relative positional relationship may probably change accordingly.

Figure 1:
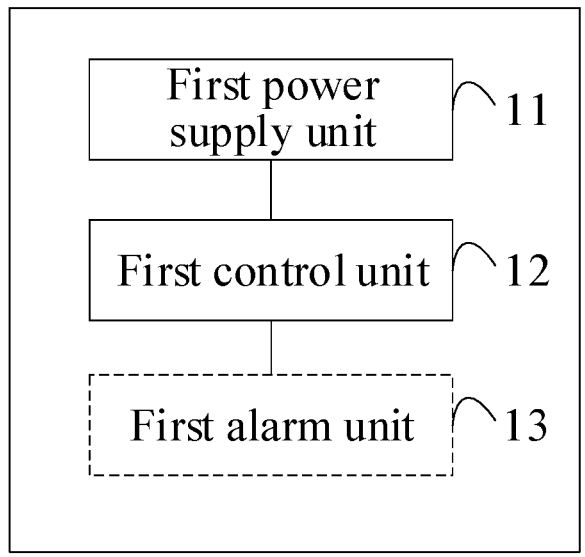
FIG. 1 is a schematic block diagram of an embodiment of an electronic label according to an embodiment of the present disclosure.

FIG. 1 shows a schematic block diagram of an embodiment of an electronic label according to an embodiment of the present disclosure.

As shown in FIG. 1, the electronic label 10 includes:

A first power supply unit 11, which is configured to supply power to the electronic label; optionally, the first power supply unit 11 includes a power supply (for example, a button cell) and a power supply circuit, and the power supply provides a power supply voltage for the electronic label; and a first control unit 12, which is configured to monitor at least one of the power supply voltage and the remaining power of the first power supply unit 11. Optionally, the method for monitoring the power supply voltage may be periodically collecting the voltage value of the power supply at a predetermined time interval, and the method for monitoring the remaining power may be periodically collecting the power value of the power supply at a predetermined time interval. Optionally, the first control unit 12 may be implemented by hardware with control functions such as a micro control unit (MCU). Optionally, the first control unit 12 may further include an analog-to-digital conversion circuit, which converts the voltage value or the power value of the first power supply unit 11 into a digital signal and reads it through an input/output (I/O) interface of the micro-control unit;

wherein, the first power supply unit 11 includes a first booster circuit, and the first control unit 12 is configured to turn on the first booster circuit to boost the power supply voltage when at least one of the following conditions is met: the power supply voltage is lower than a first preset voltage threshold; and the remaining power is lower than a first preset power threshold.

Here, the conditions for starting the first booster circuit to boost the power supply voltage can be either one or both conditions mentioned above, and the selection of the conditions can be set as required, which is not limited here.

Optionally, the first preset voltage threshold or the first preset power threshold can be set as required, and the design requirements can be, for example, when the power supply voltage is lower than the first preset voltage threshold, it is difficult to ensure the proper functioning of the electronic label, but the proper functioning of the electronic label for a period of time can be ensured after the power supply voltage is boosted. Similarly, the design requirements of the first preset power threshold can also refer to the configuration mode of the first preset voltage threshold. For example, when the remaining power is lower than the first preset power threshold, it is difficult to ensure the proper functioning of the electronic label, but the proper functioning of the electronic label for a period of time can be ensured after the power supply voltage is boosted.

For example, due to the characteristic of components—such as an IC—in the electronic label and the characteristics of the power supply (such as the characteristic of a button cell), the power supply voltage of the electronic label needs to be above 2V. In some embodiments, an early warning will be given when the power supply voltage reaches 2.3V while the power supply still has capacity; hence there is still a waste of battery power. Optionally, the first preset voltage threshold can be set to 2.3V, and the first booster circuit is turned on to boost the power supply voltage (for example, to about 3V) when the power supply voltage goes below 2.3V, allowing the electronic label to continue working, and thereby improving the power utilization rate.

It can be seen from the above embodiments that the electronic label according to the embodiments of the present disclosure can boost the power supply voltage through the first booster circuit when the power supply voltage of the electronic label is lower than the first preset voltage threshold and/or the remaining power is lower than the first preset power threshold, so that the electronic label can function properly at lower power supply voltage and/or lower remaining power, thereby prolonging the working time of the power supply and improving the use efficiency of the power supply.

In addition, the service life of the electronic label is usually set to be 5 years, while it is difficult for people to know how much the internal power of the electronic label is used during the 5-year process of using. There are cases where the display screen cannot be updated after a certain period of time. In order to improve the battery utilization rate and ensure the smooth operation of the electronic price label, a first booster circuit and its control part are added on the basis of the original circuit of the electronic label according to the embodiment of the disclosure. When the power supply voltage is lower than the first preset voltage threshold and/or the remaining power is lower than the first preset power threshold, the system controls to turn on the first booster circuit, thereby automatically boosts the power supply voltage in the condition of a low voltage or a low power. This ensures the proper update of the display screen even under low voltage or low power condition, and the power source is used more efficiently and is discharged completely, which allows the power utilization rate to reach at least 95%.

In some optional embodiments, as shown in FIG. 1, the electronic label 10 may further include a first alarm unit 13; The first control unit 12 is configured to send a first alarm instruction to the first alarm unit 13 when at least one of the following conditions is met: the power supply voltage is lower than a first preset voltage threshold; and, the remaining power is lower than a first preset power threshold; The first alarm unit 13 is configured to receive the first alarm instruction and output first alarm information.

In this way, an alarm reminder is given when the power supply voltage is lower than the first preset voltage threshold and/or the remaining power is lower than the first preset power threshold, allowing relevant personnel to timely notice the problems of insufficient voltage and/or insufficient power of the corresponding electronic label, and to further make corresponding preparations in advance, thus avoiding the potential problem of an update failure caused by insufficient battery power and the impact on normal display of product information.

Optionally, the first alarm unit 13 can output the first alarm information by any one or more of a sound, light and display. For example, when it is necessary to output sound alarm information, the first alarm unit 13 may be a speaker or buzzer and other components that make an alarm sound. Another example would be, when it is necessary to output light alarm information, the first alarm unit 13 may be an LED (Light Emitting Diode) lamp and other devices capable of lighting up. Optionally, the LED lamp can be a lamp capable of emitting light of various colors. For example, it may be a lamp capable of emitting red or green light, which emits red light when the voltage or power is low, and emits green light when the electronic label is in a proper functioning state; furthermore, if it emits red light when the voltage or power is low, the red light can be set to emit in a flashing manner, thus better serve as a warning. For another example, when the first alarm information needs to be output by display, the first alarm unit 13 may be a display screen, and the first alarm information may be displayed as a "!" or "insufficient power" etc. on the display screen. For example, when the first alarm information is output in this way, the display screen of the electronic label can be reused as the display screen for outputting the first alarm information, without an additional screen for displaying the first alarm information.

Of course, in addition to the above embodiments, other ways to output alarm information can be applied to this embodiment, and these alternatives shall also belong to the scope of protection sought in the present disclosure.

Considering that an electronic label has no feedback mechanism for service life, it takes a manual inspection when the electronic label runs out of battery or fails to update the picture, and it is difficult to be detected. Therefore, in some optional embodiments, the first control unit 12 may be further configured to: acquiring the information of the current remaining power and the usage status of the electronic label; calculating the expected remaining power according to the usage status information and the power consumption corresponding to the usage status information; comparing the current remaining power with the expected remaining power; sending a second alarm instruction to the first alarm unit 13 when the power difference between the current remaining power and the expected remaining power is greater than a preset power difference threshold.

The first alarm unit 13 is further configured to receive the second alarm instruction and output second alarm information. Optionally, the output mode of the second alarm information can be set as required, for example, any one or more of a sound, light, display, etc., which can be referred to the output mode of the first alarm information, and will not be described in detail here.

Due to the characteristics of electronic labels, an electronic label basically has a fixed daily power consumption (the power consumption varies according to the size of the display screen, and the larger the screen, the greater the power consumption), and the power consumption of an electronic label will not be too much in a short time period. In this way, the daily power consumption of an electronic label is basically the same. Therefore, abnormal discharge can be detected according to the battery information of the electronic label.

It can be seen that by adopting the above embodiments, the electronic label can be provided with a service life feedback mechanism. A comparison is made between the current remaining power with the expected remaining power through monitoring the current remaining power and the usage status information of the electronic label. When the difference between the current remaining power and the expected remaining power is greater than the preset power difference threshold, it indicates that there is abnormal power consumption, i.e. the electronic label is in an abnormal state, and relevant personnel will be reminded timely, by an alarm notification, to check or replace the corresponding electronic label. The service life feedback mechanism can avoid the potential problem of an update failure due to insufficient battery power, which affects the proper display of product information.

Optionally, the usage status information mainly includes the number of update of the electronic label (i.e., the update frequency of the display screen) and the service time of the electronic label. The power consumption corresponding to the usage status information mainly includes power consumption for update and power consumption per unit time. The first control unit 12 records the update frequency and service time of the electronic label, and calculates the expected remaining power of the electronic label under normal conditions according to the corresponding power consumption for update and power consumption per unit time. Furthermore, the first control unit 12 monitors the remaining power of the electronic label, so as to compare the current remaining power with the expected remaining power, and determine whether there is abnormal discharge. When the system gives an early warning again, the system administrator can timely notify personnel to replace the electronic label with abnormal power to ensure the proper functioning of the electronic label.

Optionally, the power consumption for update mainly includes the power consumption generated by updating the display screen, and the power consumption per unit time mainly includes the power consumption generated by data processing and standby power consumption.

Optionally, the update frequency can be counted by MCU counter, that is, the counter count is increased by one after every operation of updating the picture.

As an optional embodiment, the first control unit 12 is configured to send a third alarm instruction to the first alarm unit 13 when at least one of the following conditions is met: the power supply voltage is lower than a second preset voltage threshold; and, the remaining power is lower than a second preset power threshold;

The first alarm unit 13 is configured to receive the third alarm instruction and output third alarm information. Optionally, the output mode of the third alarm information can be set as required, for example, any one or more of a sound, light, display, etc., which can be referred to the output mode of the first alarm information, and will not be described in detail here.

It can be seen that with the above embodiments, when the power supply voltage is lower than the second preset voltage threshold and/or the remaining power is lower than the second preset power threshold, it means that it is difficult to maintain proper functioning of the electronic label even if the booster circuit boosts the power supply voltage, so the alarm reminder is performed again.

Here, the actual values of the second preset voltage threshold and the second preset power threshold can be set as required, as long as it meets the requirement that it is difficult to maintain proper functioning of the electronic label or difficult to update the display screen even if the booster circuit boosts the power supply voltage when the power supply voltage is lower than the second preset voltage threshold and/or the remaining power is lower than the second preset power threshold. For example, the value of the second preset voltage threshold can be 2V, and the value is not limited here.

Optionally, the first booster circuit is a direct current converter booster circuit (DC-DC circuit), which is simple to be implemented and can better achieve the needed boosting effect.

Figure 2:
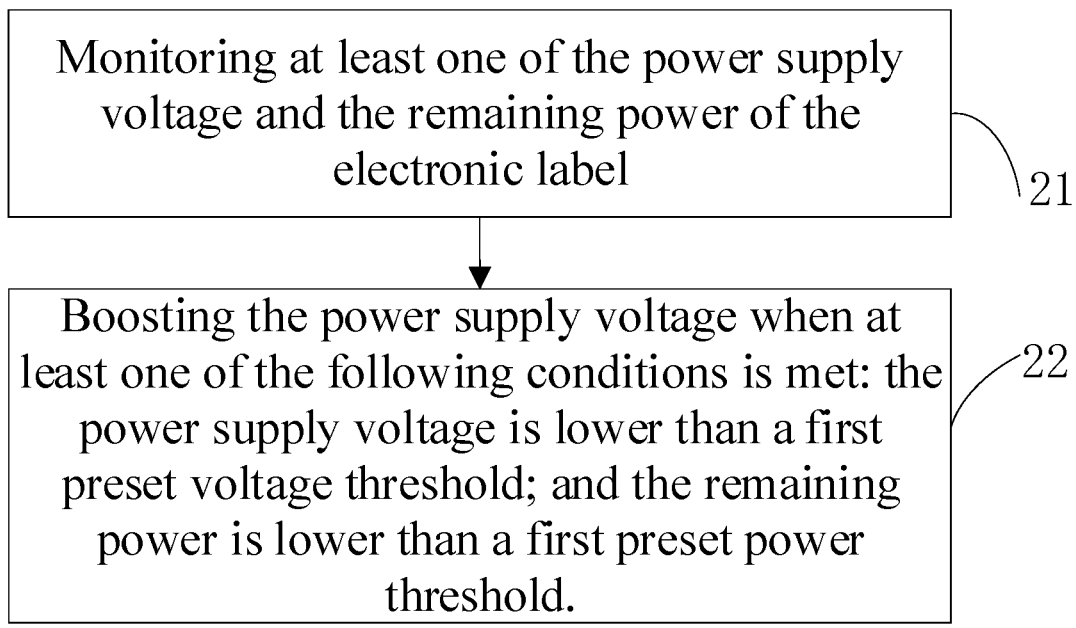
FIG. 2 is a schematic flow diagram of an embodiment of an a method for monitoring an electronic label according to an embodiment of the present disclosure.

FIG. 2 shows a schematic flow diagram of an embodiment of a method for monitoring an electronic label according to an embodiment of the present disclosure.

As shown in FIG. 2, the method for monitoring an electronic label includes step 21 and step 22, wherein:

Step 21: Monitoring at least one of the power supply voltage and the remaining power of the electronic label; Optionally, the way to monitor the power supply voltage and remaining power may be to periodically collect the voltage value and power value of the power supply at predetermined time intervals, i.e., the way to monitor the power supply voltage may be to periodically collect the voltage value of the power supply at predetermined time intervals, and the way to monitor the remaining power may be to periodically collect the power value of the power supply at predetermined time intervals;

Step 22: Boosting the power supply voltage when at least one of the following conditions is met: the power supply voltage is lower than a first preset voltage threshold; and the remaining power is lower than a first preset power threshold.

Here, the conditions for boosting the power supply voltage can be either one or both of the conditions mentioned above, and the selection of conditions can be set as required, which is not limited here.

Optionally, the first preset voltage threshold or the first preset power threshold can be set as required, and the design requirements can be, for example, when the power supply voltage is lower than the first preset voltage threshold, it is difficult to ensure the proper functioning of the electronic label, but the proper functioning of the electronic label for a period of time can be ensured after the power supply voltage is boosted. Similarly, the design requirements of the first preset power threshold can also refer to the configuration mode of the first preset voltage threshold. For example, when the remaining power is lower than the first preset power threshold, it is difficult to ensure the proper functioning of the electronic label, but the proper functioning of the electronic label for a period of time can be ensured after the power supply voltage is boosted.

It can be seen from the above embodiments that in the method for monitoring an electronic label provided by the embodiments of the present disclosure, when the power supply voltage of the electronic label is lower than the first preset voltage threshold and/or the remaining power is lower than the first preset power threshold, the electronic label can function properly at lower power supply voltage and/or lower remaining power by boosting the power supply voltage, thereby prolonging the working time of the power supply and improving the use efficiency of the power supply.

As an optional embodiment, the method for monitoring an electronic label may further include: Outputting first alarm information when at least one of the following conditions is met: the power supply voltage is lower than a first preset voltage threshold; and the remaining power is lower than a first preset power threshold.

In this way, an alarm reminder is given when the power supply voltage is lower than the first preset voltage threshold and/or the remaining power is lower than the first preset power threshold, allowing relevant personnel to timely notice the problems of insufficient voltage and/or insufficient power of the corresponding electronic label, and to further make corresponding preparations in advance, thus avoiding the potential problem of an update failure caused by insufficient battery power and the impact on normal display of product information.

Figure 3:
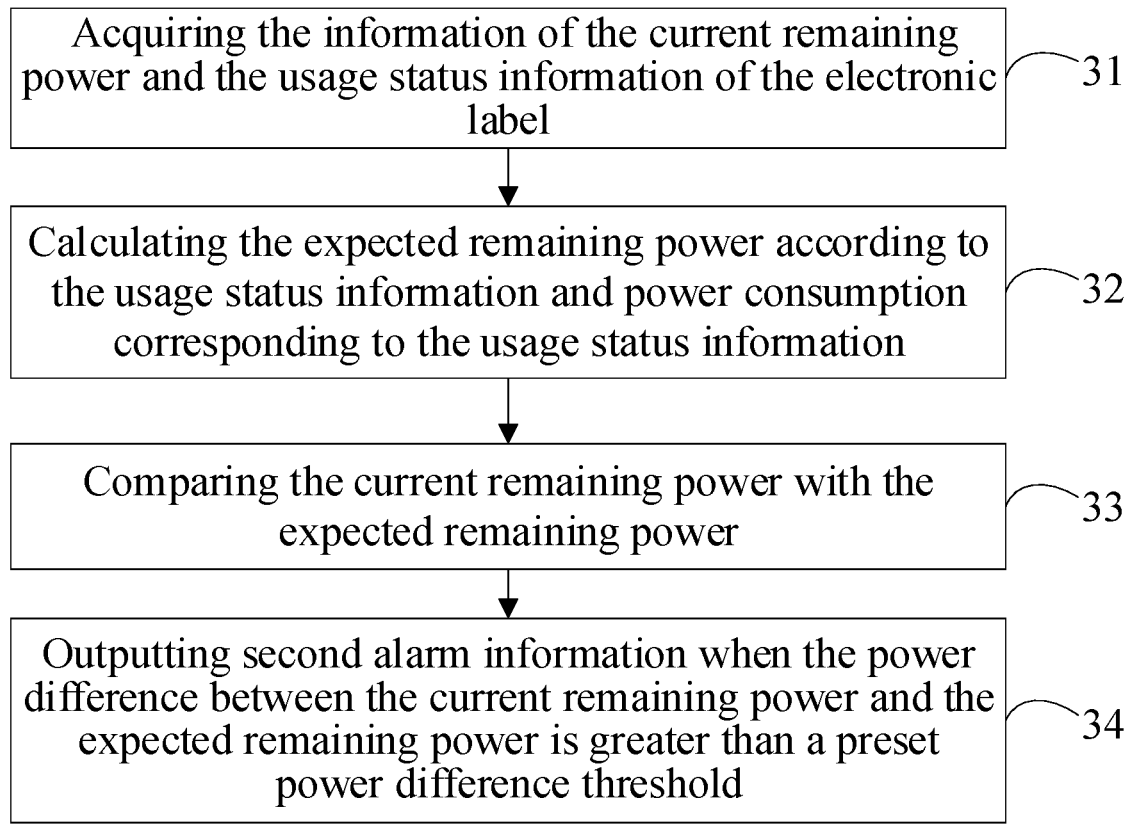
FIG. 3 is a schematic flow diagram of another embodiment of a method for monitoring an electronic label according to an embodiment of the present disclosure.

In some optional embodiments, as shown in FIG. 3, the method for monitoring an electronic label may further include: Step 31: Acquiring the information of the current remaining power and the usage status of the electronic label; Step 32: Calculating the expected remaining power according to the usage status information and the power consumption corresponding to the usage status information; Step 33: Comparing the current remaining power with the expected remaining power; Step 34: Outputting second alarm information when the power difference between the current remaining power and the expected remaining power is greater than a preset power difference threshold.

It can be seen that by adopting the above embodiments, the electronic label can be provided with a service life feedback mechanism. A comparison is made between the current remaining power with the expected remaining power by monitoring the current remaining power and usage status information of the electronic label. When the power difference between the current remaining power and the expected remaining power is greater than the preset power difference threshold, it indicates that there is abnormal power consumption, in other words, the electronic label is in an abnormal state, and relevant personnel will be reminded timely, by an alarm notification, to check or replace the corresponding electronic label in time. The service life feedback mechanism can avoid the potential problem of an update failure due to insufficient battery power, which affects the normal display of product information.

Optionally, the usage status information includes the update frequency of the electronic label and the service time of the electronic label. The power consumption corresponding to the usage status information includes power consumption for update and power consumption per unit time.

As an optional embodiment, the method for monitoring an electronic label may further include: outputting third alarm information when at least one of the following conditions is met: the power supply voltage is lower than a second preset voltage threshold; and the remaining power is lower than a second preset power threshold.

It can be seen that with the above embodiments, when the power supply voltage is lower than the second preset voltage threshold and/or the remaining power is lower than the second preset power threshold, it means that it is difficult to maintain proper functioning of the electronic label even if the booster circuit boosts the power supply voltage, so the alarm reminder is performed again.

Based on the consideration of reducing the power consumption of the electronic label and prolonging the service life of the power supply, the steps related to data processing and calculation can be put into the general control terminal (e.g., the electronic label monitoring device 70 shown in FIG. 7), thereby reducing the processing steps performed by the electronic label itself and achieving the effect of prolonging the service life of the power supply.

Figure 4:
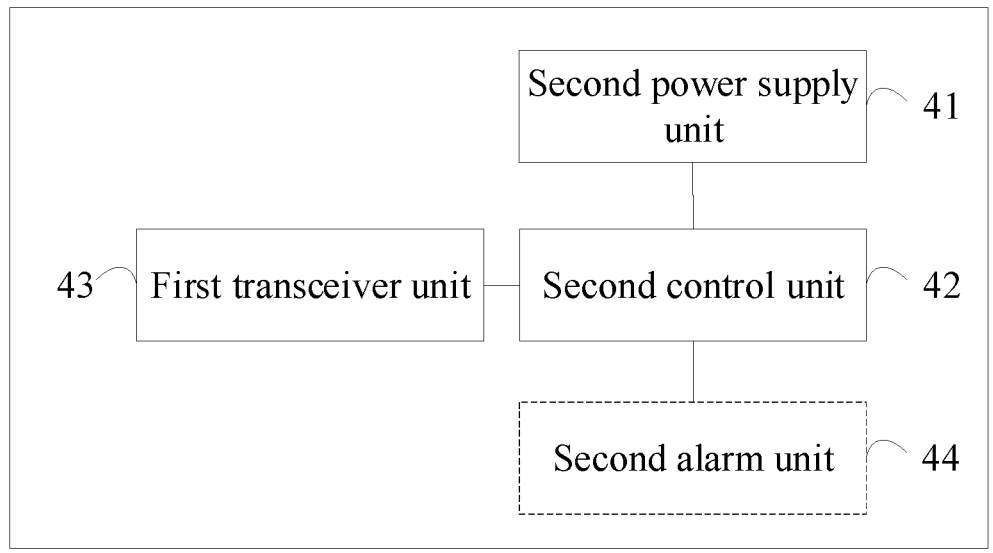
FIG. 4 is a schematic block diagram of another embodiment of an electronic label according to an embodiment of the present disclosure.

Therefore, another aspect of the present disclosure provides another embodiment of the electronic label. FIG. 4 shows another schematic block diagram of an embodiment of an electronic label according to an embodiment of the present disclosure.

As shown in FIG. 4, the electronic label 40 includes:

a second power supply unit 41, which is configured to supply power to the electronic label; optionally, the second power supply unit 41 includes a power supply (for example, a button cell) and a power supply circuit, and the power supply provides a power supply voltage for the electronic label;

a second control unit 42, which is configured to monitor at least one of the power supply voltage and the remaining power of the second power supply unit. Optionally, the method for monitoring the power supply voltage may be periodically collecting the voltage value of the power supply at a predetermined time interval, and the method for monitoring the remaining power may be periodically collecting the power value of the power supply at a predetermined time interval. Optionally, the second control unit 42 may be implemented by hardware with control functions such as a micro control unit (MCU). Optionally, the second control unit 42 may further include an analog-to-digital conversion circuit, which converts the voltage value or the power value of the second power supply unit 41 into a digital signal and reads it through an I/O interface of the micro-control unit; and a first transceiver unit 43, which is configured to report at least one of the power supply voltage and the remaining power to the electronic label monitoring device 70 (see FIG. 7), and receive at least one of the following contents: a comparison result between the power supply voltage and a third preset voltage threshold, and a comparison result between the remaining power and a third preset power threshold; optionally, the comparison result can be calculated by the electronic label monitoring device 70 and returned to the electronic label;

wherein, the second power supply unit 41 includes a second booster circuit, and the second control unit 42 is configured to turn on the second booster circuit to boost the power supply voltage when at least one of the following conditions is met: the power supply voltage is lower than a third preset voltage threshold; and the remaining power is lower than a third preset power threshold.

Here, the conditions for starting the second booster circuit to boost the power supply voltage can be either one or both of the conditions mentioned above, and the selection of the conditions can be set as required, which is not limited here.

Optionally, the third preset voltage threshold or the third preset power threshold can be set as required, and the design requirements can be, for example, when the power supply voltage is lower than the third preset voltage threshold, it is difficult to ensure the proper functioning of the electronic label, but the proper functioning of the electronic label can be ensured for a period of time after the power supply voltage is boosted; for example, the value of the third preset voltage threshold may be 2.3V. Similarly, the design requirements of the third preset power threshold can also refer to the configuration mode of the third preset voltage threshold. For example, when the remaining power is lower than the third preset power threshold, it is difficult to ensure the proper functioning of the electronic label, but the proper functioning of the electronic label can be ensured for a period of time after the power supply voltage is boosted.

Here, the third preset voltage threshold may be the same as or different from the aforementioned first preset voltage threshold, and the implementation may be different according to needs, and the relationship between the values of the two thresholds is not limited here. Similarly, the third preset power threshold may be the same as or different from the first preset power threshold.

It can be seen from the above embodiments that the electronic label according to the embodiments of the present disclosure can boost the power supply voltage through the second booster circuit when the power supply voltage of the electronic label is lower than the third preset voltage threshold and/or the remaining power is lower than the third preset power threshold, so that the electronic label can function properly at lower power supply voltage and/or lower remaining power, thereby prolonging the working time of the power supply and improving the use efficiency of the power supply. In addition, the electronic label reports the power supply voltage and remaining power to the electronic label monitoring device, and directly receives the data processing result from the electronic label monitoring device, thereby reducing the processing steps performed by the electronic label itself, further reducing the power consumption as well as further prolonging the service life of the power supply.

In some optional embodiments, as shown in FIG. 4, the electronic label 40 may further include a second alarm unit 44; The second control unit 42 is configured to send a fourth alarm instruction to the second alarm unit 44 when at least one of the following conditions is met: the power supply voltage is lower than a third preset voltage threshold; and, the remaining power is lower than a third preset power threshold; The second alarm unit 44 is configured to receive the fourth alarm instruction and output fourth alarm information.

In this way, an alarm reminder is given when the power supply voltage is lower than the third preset voltage threshold and/or the remaining power is lower than the third preset power threshold, allowing relevant personnel to timely notice the problems of insufficient voltage and/or insufficient power of the corresponding electronic label, and to further make corresponding preparations in advance, thus avoiding the potential problem of an update failure caused by insufficient battery power and the impact on normal display of product information.

Optionally, the second alarm unit 44 can output the fourth alarm information by any one or more of a sound, light and display. For example, when it is necessary to output sound alarm information, the second alarm unit 44 may be a speaker or buzzer and other components that make an alarm sound. Another example would be, when it is necessary to output light alarm information, the second alarm unit 44 may be an LED lamp and other devices capable of lighting up. Optionally, the LED lamp can be a lamp capable of emitting light of various colors. For example, it may be a lamp capable of emitting red or green light, which emits red light when the voltage or power is low, and emits green light when the electronic label is in a proper functioning state; furthermore, if it emits red light when the voltage or power is low, the red light can be set to emit in a flashing manner, thus better serve as a warning. For another example, when the fourth alarm information needs to be output by display, the second alarm unit 44 may be a display screen, and the fourth alarm information may be an image displayed as a "!" or "insufficient power" etc. on the display screen. For example, when the fourth alarm information is output in this way, the display screen of the electronic label can be reused as the display screen for outputting the first alarm information, without an additional screen for displaying the fourth alarm information.

Of course, in addition to the above embodiments, other ways to output alarm information can be applied to this embodiment, and these alternative embodiments should also belong to the scope of protection sought in the present disclosure.

In some optional embodiments, the first transceiver unit 43 is configured to report the usage status information of the electronic label to the electronic label monitoring device 70 and receive the comparison result between the current remaining power and the expected remaining power of the electronic label; The second control unit 42 is configured to send a fifth alarm instruction to the second alarm unit 44 when the power difference between the current remaining power and the expected remaining power is greater than a preset power difference threshold; the second alarm unit 44 is configured to receive the fifth alarm instruction and output fifth alarm information; optionally, the output mode of the fifth alarm information can be set as required, for example, any one or more of a sound, light, display, etc., which can be referred to the output mode of the fourth alarm information, and will not be described in detail here.

Due to the characteristics of electronic labels, an electronic label basically has a fixed daily power consumption (the power consumption varies according to the size of the display screen, and the larger the screen, the greater the power consumption), and the power consumption of an electronic label will not be too much in a short time period. In this way, the daily power consumption of an electronic label is basically the same. Therefore, abnormal discharge can be determined according to the battery power information of the electronic label.

It can be seen that by adopting the above embodiments, the electronic label can be provided with a service life feedback mechanism. A comparison is made between the current remaining power with the expected remaining power by monitoring the current remaining power and usage status information of the electronic label. When the difference between the current remaining power and the expected remaining power is greater than the preset power difference threshold, it indicates that there is abnormal power consumption, i.e. the electronic label is in an abnormal state, and relevant personnel will be reminded timely, by an alarm notification, to check or replace the corresponding electronic label in time. The service life feedback mechanism can avoid the potential problem of an update failure due to insufficient battery power, which affects the normal display of product information.

Optionally, the usage status information includes the update frequency of the electronic label (i.e., the quantity of update of the display screen) and the service time of the electronic label. The power consumption corresponding to the usage status information includes power consumption for update and power consumption per unit time. The second control unit 42 records the update frequency and service time of the electronic label, and calculates the expected remaining power of the electronic label under normal conditions according to the corresponding power consumption for update and power consumption per unit time. Furthermore, the second control unit 42 monitors the remaining power of the electronic label, so as to compare the current remaining power with the expected remaining power, and determine whether there is abnormal discharge. When the system gives an early warning again, the system administrator can timely notify personnel to replace the abnormal electronic label to ensure the proper functioning of the electronic label.

Optionally, the power consumption for update may include update power consumption and data transmission power consumption, and the power consumption per unit time may include detection power consumption and standby power consumption. The update power consumption may refer to the power consumption needed to update the display picture of the electronic label. The data transmission power consumption may refer to the power consumption generated by receiving updated display picture data and the power consumption for reporting the request for update. The detection power consumption may refer to the power consumption generated by the electronic label detecting the instruction to update the picture. The standby power consumption may refer to the power consumption generated when the electronic label is in standby state.

Optionally, the update frequency can be counted by MCU counter, that is, the counter count is increased by one after every operation of updating the picture.

Optionally, in addition to the aforementioned implementation of comparing the current remaining power with the expected remaining power, it is also possible to compare the battery power information reported by the electronic label last time with the battery power information reported by the electronic label this time. If the battery power difference between the two times is greater than the preset single power difference threshold, it means that a warning message needs to be sent when the battery consumes too much in a short time.

As an optional embodiment, the first transceiver unit 43 is configured to receive at least one of a comparison result between the power supply voltage and a fourth preset voltage threshold and a comparison result between the remaining power and a fourth preset power threshold;

the second control unit 42 is configured to send a sixth alarm instruction to the second alarm unit 44 when at least one of the following conditions is met: the power supply voltage is lower than a fourth preset voltage threshold; and, the remaining power is lower than a fourth preset power threshold;

the second alarm unit 44 is configured to receive the sixth alarm instruction and output sixth alarm information; optionally, the output mode of the sixth alarm information can be set as required, for example, any one or more of a sound, light, display, etc., which can be referred to the output mode of the fourth alarm information, and will not be described in detail here.

It can be seen that with the above embodiments, when the power supply voltage is lower than the fourth preset voltage threshold and/or the remaining power is lower than the fourth preset power threshold, it means that it is difficult to maintain proper functioning even if the booster circuit boosts the power supply voltage, so the alarm reminder is performed again.

Here, the actual values of the fourth preset voltage threshold and the fourth preset power threshold can be set as required, as long as it is difficult to maintain proper functioning or update the display screen even if the booster circuit boosts the power supply voltage when the power supply voltage is lower than the fourth preset voltage threshold and/or the remaining power is lower than the fourth preset power threshold. For example, the value of the fourth preset voltage threshold can be 2V, and the value is not limited here.

Here, the fourth preset voltage threshold may be the same as or different from the aforementioned second preset voltage threshold, and the implementation may be different according to needs, and the relationship between the values of the two thresholds is not limited here. Similarly, the fourth preset power threshold may be the same as or different from the second preset power threshold.

Optionally, the second booster circuit is a direct current converter booster circuit (DC-DC circuit), which is simple to be implemented and can better achieve the needed boosting effect.

Figure 5:
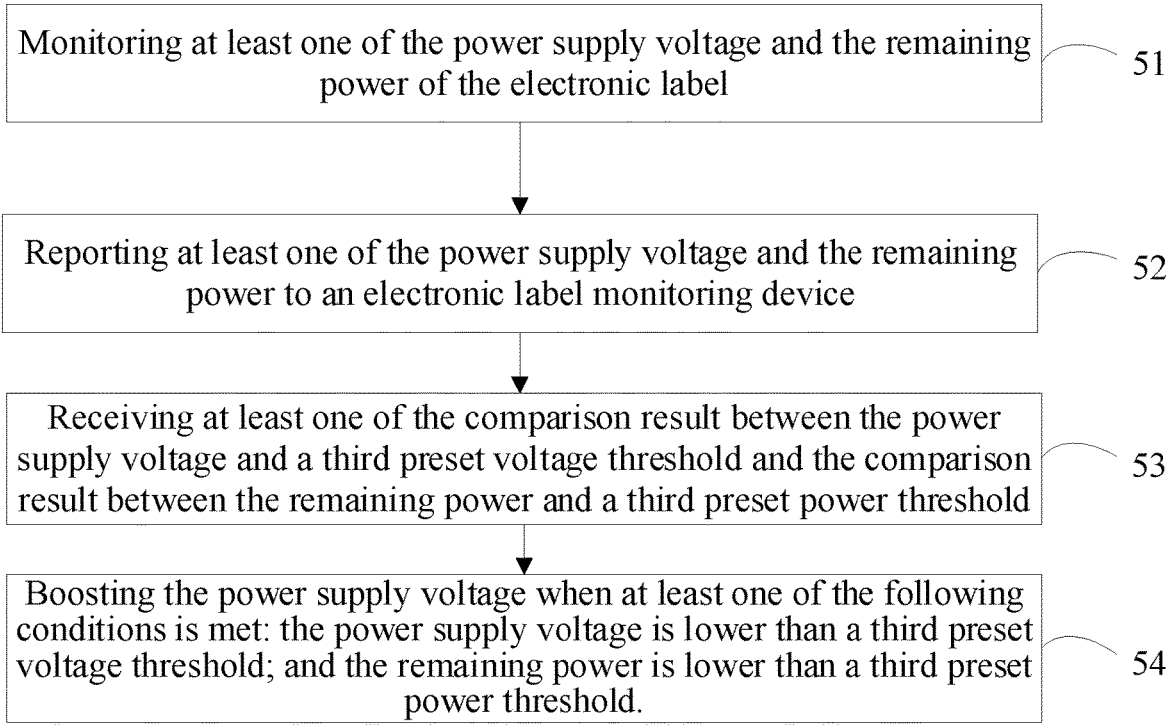
FIG. 5 is a schematic flow diagram of an embodiment of a method for monitoring the power supply of an electronic label according to an embodiment of the present disclosure.

FIG. 5 shows a flow diagram of an embodiment of a method for monitoring the power supply for an electronic label according to an embodiment of the present disclosure.

As shown in FIG. 5, the method for monitoring the power supply for an electronic label includes step 51 to step 54, wherein:

In Step 51: Monitoring at least one of the power supply voltage and the remaining power of the electronic label;

In Step 52: Reporting at least one of the power supply voltage and the remaining power to the electronic label monitoring device;

In Step 53: Receiving at least one of the comparison result between the power supply voltage and a third preset voltage threshold and the comparison result between the remaining power and a third preset power threshold;

In Step 54: Boosting the power supply voltage when at least one of the following conditions is met: the power supply voltage is lower than a third preset voltage threshold; and the remaining power is lower than a third preset power threshold.

It can be seen from the above embodiment that in the method for monitoring the power supply for an electronic label provided by the embodiment of the present disclosure, when the power supply voltage of the electronic label is lower than the third preset voltage threshold and/or the remaining power is lower than the third preset power threshold, the electronic label can function properly at lower power supply voltage and/or lower remaining power by boosting the power supply voltage, thereby prolonging the working time of the power supply and improving the use efficiency of the power supply. In addition, the electronic label reports the power supply voltage and remaining power to the electronic label monitoring device, and directly receives the data processing result from the electronic label monitoring device, thereby reducing the processing steps performed by the electronic label itself, further reducing the power consumption as well as further prolonging the service life of the power supply.

In some optional embodiments, the method for monitoring the power supply for an electronic label may further include: outputting fourth alarm information when at least one of the following conditions is met: the power supply voltage is lower than a third preset voltage threshold; and the remaining power is lower than a third preset power threshold.

In this way, an alarm reminder is given when the power supply voltage is lower than the third preset voltage threshold and/or the remaining power is lower than the third preset power threshold, allowing relevant personnel to timely notice the problems of insufficient voltage and/or insufficient power of the corresponding electronic label, and to further make corresponding preparations in advance, thus avoiding the potential problem of an update failure caused by insufficient battery power and the impact on normal display of product information.

Figure 6:
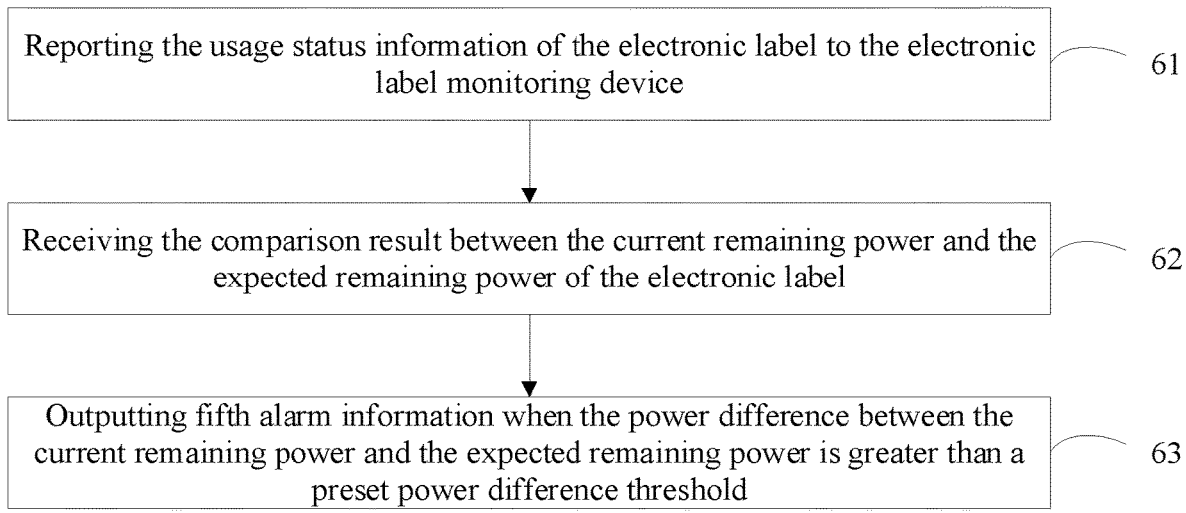
FIG. 6 is a flow diagram of another embodiment of a method for monitoring the power supply for an electronic label according to an embodiment of the present disclosure.

In some optional embodiments, as shown in FIG. 6, the method for monitoring the power supply for an electronic label may further include:

In Step 61: Reporting the usage status information of the electronic label to the electronic label monitoring device;

In Step 62: Receiving the comparison result between the current remaining power and the expected remaining power of the electronic label;

In Step 63: Outputting fifth alarm information when the power difference between the current remaining power and the expected remaining power is greater than a preset power difference threshold.

It can be seen that by adopting the above embodiments, the electronic label can be provided with a service life feedback mechanism. A comparison is made between the current remaining power with the expected remaining power by monitoring the current remaining power and usage status information of the electronic label. When the power difference between the current remaining power and the expected remaining power is greater than the preset power difference threshold, it indicates that there is abnormal power consumption, i.e. when the electronic label is in an abnormal state, and relevant personnel will be reminded timely, by an alarm notification, to check or replace the corresponding electronic label in time. The service life feedback mechanism can avoid the potential problem of an update failure due to insufficient battery power, which affects the normal display of product information.

Optionally, the usage status information includes the update frequency of the electronic label and the service time of the electronic label. The power consumption corresponding to the usage status information includes power consumption for update and power consumption per unit time.

As an optional embodiment, the method for monitoring the power supply for an electronic label may further include: receiving at least one of the comparison result between the power supply voltage and a fourth preset voltage threshold and the comparison result between the remaining power and a fourth preset power threshold; outputting sixth alarm information when at least one of the following conditions is met: the power supply voltage is lower than a fourth preset voltage threshold; and the remaining power is lower than a fourth preset power threshold.

It can be seen that with the above embodiments, when the power supply voltage is lower than the fourth preset voltage threshold and/or the remaining power is lower than the fourth preset power threshold, it means that it is difficult to maintain proper functioning even if the booster circuit boosts the power supply voltage, so the alarm reminder is performed again.

Figure 7:
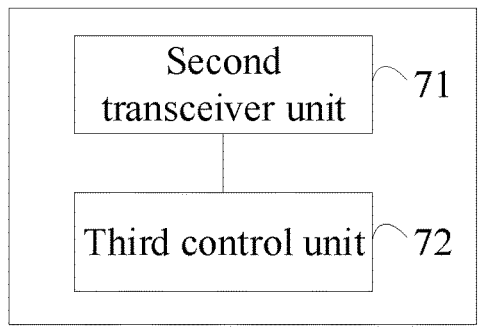
FIG. 7 is a schematic block diagram of an embodiment of an electronic label monitoring device according to an embodiment of the present disclosure.

FIG. 7 shows a schematic block diagram of an embodiment of an electronic label monitoring device according to an embodiment of the present disclosure.

As shown in FIG. 7, the electronic label monitoring device 70 includes:

a second transceiver unit 71, which is configured to receive at least one of the power supply voltage and the remaining power of the electronic label 40, and send at least one of the comparison result between the power supply voltage and a third preset voltage threshold and the comparison result between the remaining power and a third preset power threshold to the electronic label 40; and a third control unit 72, which is configured to call at least one of the third preset voltage threshold and the third preset power threshold, and compare at least one of the following two sets of values to obtain the comparison result: between the power supply voltage and the third preset voltage threshold, and between the remaining power and the third preset power threshold.

It can be seen from the above embodiments that the electronic label monitoring device disclosed in this embodiment of the disclosure compares the power supply voltage with the third preset voltage threshold and/or compares the remaining power with the third preset power threshold, and sends the comparison result to the electronic label, so that the electronic label can determine whether to turn on the booster circuit according to the comparison result. This allows the electronic label to be function properly even at lower power supply voltage and/or lower remaining power, thereby prolonging the working time of the power supply and improving the use efficiency of the power supply.

In some optional embodiments, the second transceiver unit 71 is configured to receive the usage status information of the electronic label 40 and send the comparison result between the current remaining power and the expected remaining power to the electronic label 40;

the third control unit 72 is configured to calculate the expected remaining power according to the usage status information of the electronic label 40 and the power consumption corresponding to the usage status information, and is configured to compare the current remaining power with the expected remaining power to obtain a comparison result.

It can be seen that with the above embodiments, by comparing the current remaining power with the expected remaining power and sending the comparison result to the electronic label, the electronic label can determine whether to send an alarm according to the comparison result. When the power difference between the current remaining power and the expected remaining power is greater than the preset power difference threshold, it indicates that there is abnormal power consumption, in other words, when the electronic label is in an abnormal state, the relevant personnel may be reminded timely by an alarm notification, to check or replace the corresponding electronic label in time.

Optionally, the usage status information includes the update frequency of the electronic label and the service time of the electronic label. The power consumption corresponding to the usage status information includes power consumption for update and power consumption per unit time.

Optionally, in addition to the aforementioned implementation of comparing the current remaining power with the expected remaining power, it is possible to compare the battery power information reported by the electronic label last time with the battery power information reported by the electronic label this time. If the battery power difference between the two times is greater than the preset single power difference threshold, it means that a warning message needs to be sent when the battery consumes too much in a short time.

As an optional embodiment, a third control unit 72 is configured to call at least one of the fourth preset voltage threshold and the fourth preset power threshold, and compare at least one of the following two sets of values to obtain the comparison result: between the power supply voltage and the fourth preset voltage threshold, and between the remaining power and the fourth preset power threshold;

The second transceiver unit 71 is configured to send at least one of the comparison result between the power supply voltage and a fourth preset voltage threshold and the comparison result between the remaining power and a fourth preset power threshold to the electronic label.

It can be seen that with the above embodiments, by comparing the power supply voltage with the fourth preset voltage threshold and/or comparing the remaining power with the fourth preset power threshold and sending the comparison result to the electronic label, the electronic label can determine whether to give an alarm according to the comparison result. When the power supply voltage is lower than the fourth preset voltage threshold and/or the remaining power is lower than the fourth preset power threshold, it means that it is difficult to maintain proper functioning even if the booster circuit boosts the power supply voltage, so the electronic label can give an alarm reminder again.

Figure 8:
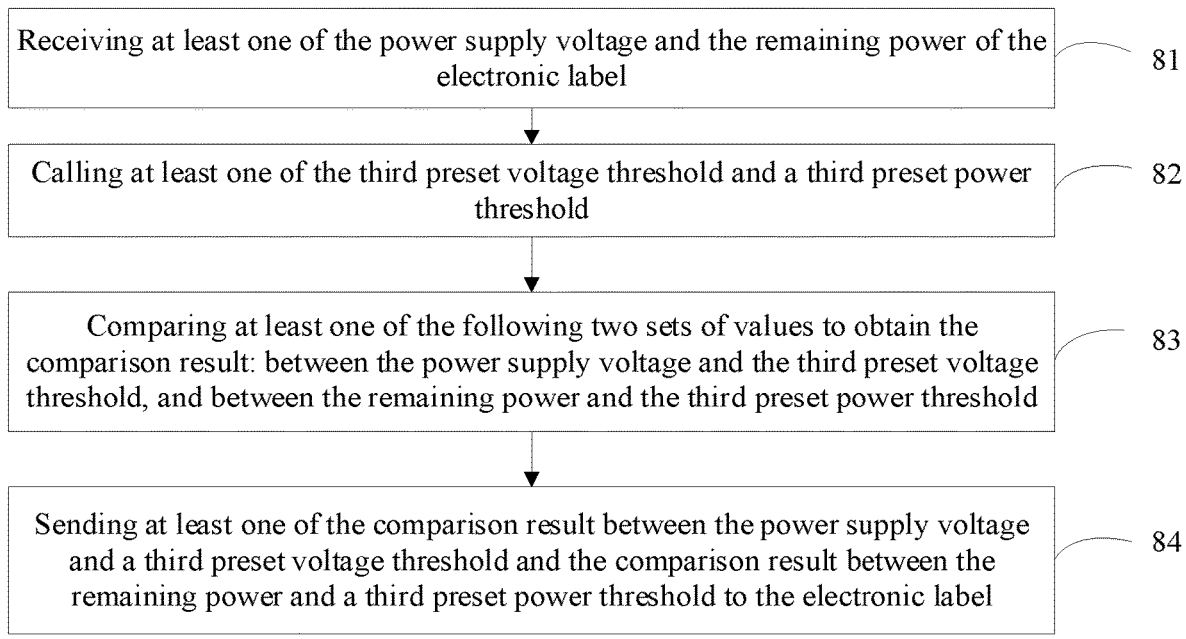
FIG. 8 is a schematic flow diagram of another embodiment of a method for monitoring an electronic label according to an embodiment of the present disclosure.

FIG. 8 shows another schematic flow diagram of an embodiment of a method for monitoring an electronic label according to an embodiment of the present disclosure.

The method for monitoring an electronic label includes step 81 to step 84, wherein:

In Step 81: Receiving at least one of the power supply voltage and the remaining power of the electronic label;

In Step 82: Calling at least one of the third preset voltage threshold and a third preset power threshold;

In Step 83: Comparing at least one of the following two sets of values to obtain the comparison result: between the power supply voltage and the third preset voltage threshold, and between the remaining power and the third preset power threshold;

In Step 84: Sending at least one of the comparison result between the power supply voltage and a third preset voltage threshold and the comparison result between the remaining power and a third preset power threshold to the electronic label.

It can be seen from the above embodiments that the method for monitoring an electronic label disclosed in this embodiment of the disclosure compares the power supply voltage with the third preset voltage threshold and/or compares the remaining power with the third preset power threshold, and sends the comparison result to the electronic label, so that the electronic label can determine whether to turn on the booster circuit according to the comparison result. This allows the electronic label to be function properly even at lower power supply voltage and/or lower remaining power, thereby prolonging the working time of the power supply and improving the use efficiency of the power supply.

Figure 9:
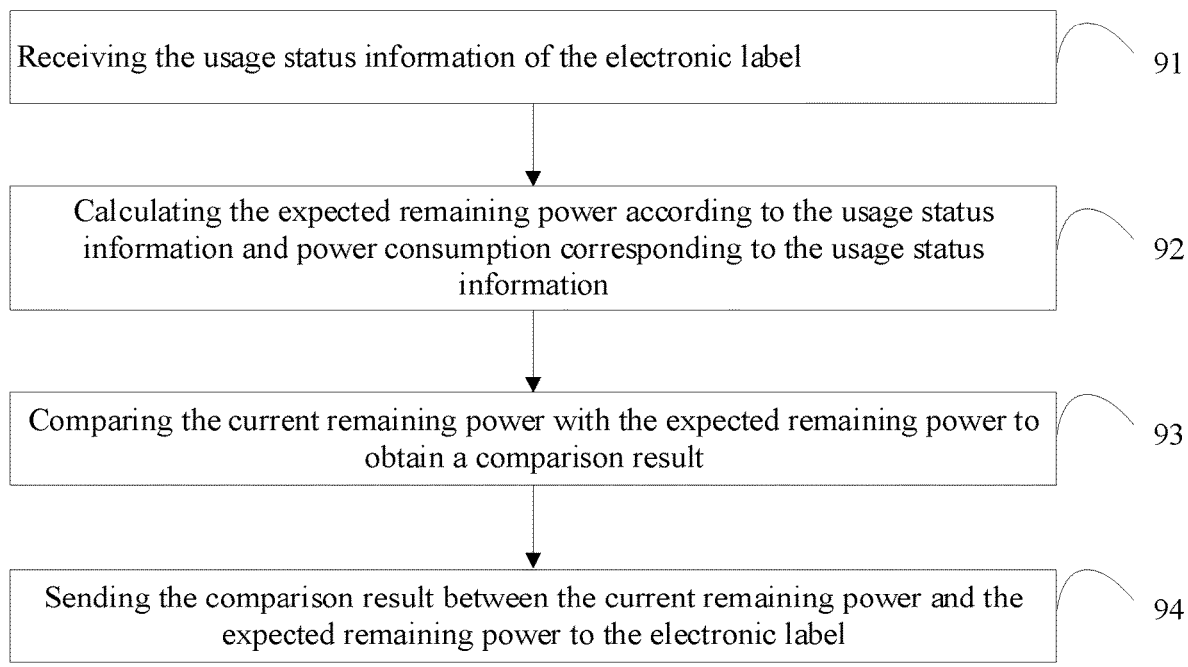
FIG. 9 is a schematic flow diagram of another embodiment of an a method for monitoring an electronic label according to an embodiment of the present disclosure.

In some optional embodiments, as shown in FIG. 9, the method for monitoring an electronic label may further include:

In Step 91: Receiving the usage status information of the electronic label; In Step 92: Calculating the expected remaining power according to the usage status information and the power consumption corresponding to the usage status information;

In Step 93: Comparing the current remaining power with the expected remaining power to obtain a comparison result;

In Step 94: Sending the comparison result between the current remaining power and the expected remaining power to the electronic label.

It can be seen that with the above embodiments, by comparing the current remaining power with the expected remaining power and sending the comparison result to the electronic label, the electronic label can determine whether to send an alarm according to the comparison result. When the power difference between the current remaining power and the expected remaining power is greater than the preset power difference threshold, it indicates that there is abnormal power consumption, in other words, the electronic label is in an abnormal state, and may timely remind the relevant personnel by an alarm notification, to check or replace the corresponding electronic label in time.

Optionally, the usage status information includes the update frequency of the electronic label and the service time of the electronic label. The power consumption corresponding to the usage status information includes power consumption for update and power consumption per unit time.

As an optional embodiment, the method for monitoring an electronic label may further include: calling at least one of a fourth preset voltage threshold and a fourth preset power threshold; comparing at least one of the following two sets of values to obtain the comparison result: between the power supply voltage and the fourth preset voltage threshold, and between the remaining power and the fourth preset power threshold; sending at least one of the comparison result between the power supply voltage and a fourth preset voltage threshold and the comparison result between the remaining power and a fourth preset power threshold to the electronic label.

It can be seen that with the above embodiments, by comparing the power supply voltage with the fourth preset voltage threshold and/or comparing the remaining power with the fourth preset power threshold and sending the comparison result to the electronic label, the electronic label can determine whether to give an alarm according to the comparison result. When the power supply voltage is lower than the fourth preset voltage threshold and/or the remaining power is lower than the fourth preset power threshold, it means that it is difficult to maintain proper functioning even if the booster circuit boosts the power supply voltage, so the electronic label can give an alarm reminder again.

In an exemplary embodiment, the electronic label monitoring device may include a processor, a memory, and a computer program stored on the memory and run on the processor. The method for monitoring an electronic label as described above are achieved when the processor executes the program.

Figure 11:
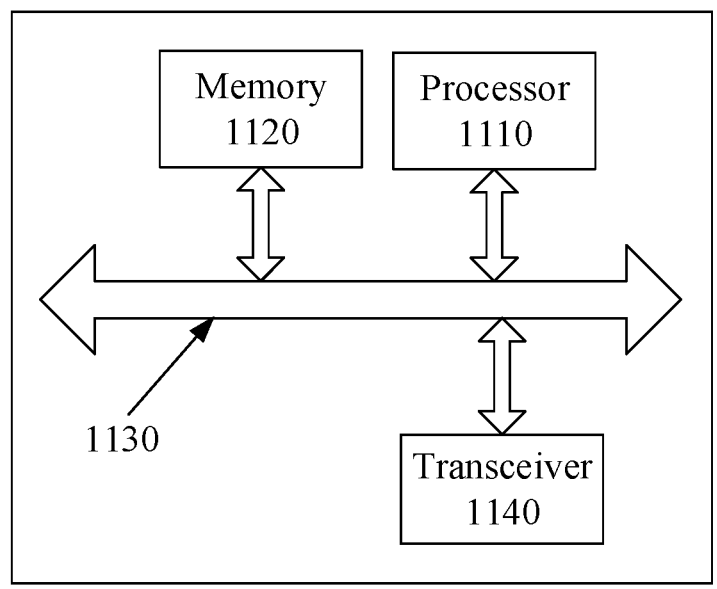
FIG. 11 is a schematic block diagram of another embodiment of an electronic label monitoring device according to an embodiment of the present disclosure.

As shown in FIG. 11, in an example, an electronic label monitoring device 1100 may include: a processor 1110, a memory 1120, a bus system 1130 and a transceiver 1140, wherein the processor 1110, the memory 1120 and the transceiver 1140 are connected via the bus system 1130, the memory 1120 is used for storing instructions, and the processor 1110 is used for executing the instructions stored in the memory 1120 to control the transceiver 1140 to send signals. For example, in the electronic label monitoring device, the operation of the second transceiver unit 71 may be executed by the transceiver 1140 under the control of the processor 1110, and the operation of the third control unit 72 can be executed by the processor 1110.

It should be understood that the processor 1110 may be a Central Processing Unit (CPU) or MCU, or the processor 1110 may be other general-purpose processor, a digital signal processor (DSP), an application specific integrated circuit (ASIC), a field programmable gate array (FPGA) or other programmable logic devices, a discrete gate or transistor logic device, a discrete hardware components, etc. The general purpose processor may be a microprocessor, or the processor may be any conventional processor, or the like.

The memory 1120 may include a read-only memory and a random access memory, and provides instructions and data to the processor 1110. A portion of the memory 1120 may include a non-volatile random access memory.

The bus system 1130 may include a power bus, a control bus, a status signal bus, and the like in addition to a data bus. However, for clarity of illustration, various buses are denoted as the bus system 1130 in FIG. 11.

In the implementation process, the processing performed by the electronic label monitoring device may be completed by an integrated logic circuit of the hardware in the processor 1110 or instructions in form of software. That is, the steps of the methods in the embodiments disclosed in the present disclosure may be implemented by a hardware processor, or the combination of the hardware in the processor and software modules. The software module may be located in a storage medium such as a random memory, a flash memory, a read-only memory, a programmable read-only memory or an electrically erasable programmable memory, a register. The storage medium is located in the memory 1120, and the processor 1110 reads the information in the memory 1120 and completes the steps of the above methods in combination with its hardware. It will not be described in detail here to avoid repetition.

Figure 10:
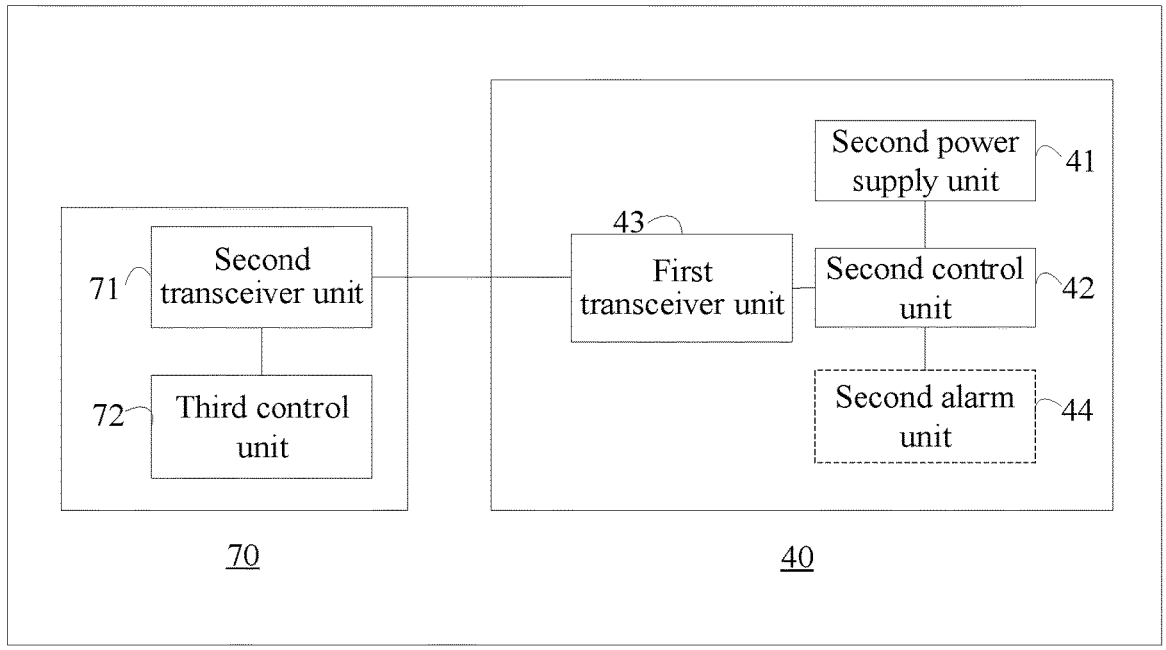
FIG. 10 is a schematic block diagram of an embodiment of an electronic label system according to an embodiment of the present disclosure.

FIG. 10 shows a schematic block diagram of an embodiment of an electronic label system according to an embodiment of the present disclosure.

The electronic label system 100 includes: any embodiment or arrangement and combination of embodiments of the aforementioned electronic label 40; and any embodiment or arrangement and combination of embodiments of the aforementioned electronic label monitoring device 70; the electronic label 40 may be one or multiple.

The electronic label system according to the embodiments of the present disclosure can boost the power supply voltage through the second booster circuit set in the electronic label when the power supply voltage of the electronic label is lower than the third preset voltage threshold and/or the remaining power is lower than the third preset power threshold, so that the electronic label can function properly at lower power supply voltage and/or lower remaining power, thereby prolonging the working time of the power supply and improving the use efficiency of the power supply.

Optionally, the data transmission between the electronic label 40 and the electronic label monitoring device 70 can utilize the original communication protocol of the electronic label 40, and the electronic label 40 can report the usage status information at a fixed time, and synchronously report the battery voltage and power information of the electronic label 40.

It can be seen from the above, the electronic label and the monitoring method thereof, device, and system according to the embodiments of the present disclosure can boost the power supply voltage through the booster circuit set in the electronic label when the power supply voltage of the electronic label is lower than the preset voltage threshold and/or the remaining power is lower than the preset power threshold, so that the electronic label can function properly at lower power supply voltage and/or lower remaining power, thereby prolonging the working time of the power supply and improving the use efficiency of the power supply.

One of ordinary skill in the art to which the present application pertains should understand that the above description is only the embodiments of the present disclosure and is not intended to limit the technical solution of the present disclosure. Any amendment, equivalent substitution, improvement and the like made within the spirit and principles of the embodiments of the present disclosure shall be included in the scope of protection of the present disclosure.

Those of ordinary skill in the art will understand that all or some of the acts, systems, and functional modules/units in the devices disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or step may be performed by several physical components in cooperation. Some or all of the components may be implemented as software executed by a processor, such as a digital signal processor or a microprocessor, or be implemented as hardware, or be implemented as an integrated circuit, such as an application specific integrated circuit. Such software may be distributed on computer readable media, which may include computer storage media (or non-transitory media) and communication media (or transitory media). As is well known to those of ordinary skill in the art, the term computer storage media includes volatile and nonvolatile, removable and non-removable media implemented in any method or technology for storing information (such as computer readable instructions, data structures, program modules or other data). Computer storage media include, but are not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other media that can be used to store desired information and can be accessed by a computer. Furthermore, it is well known to those of ordinary skill in the art that communication media typically contain computer readable instructions, data structures, program modules, or other data in a modulated data signal such as a carrier wave or other transmission mechanism, and may include any information delivery medium.

What is claimed is:

1. An electronic label, comprising:
   a first power supplier, configured to supply power to the electronic label; and
   a first controller, configured to monitor at least one of a power supply voltage and a remaining power of the first power supplier,
   wherein the first power supplier comprises a first booster circuit, and the first controller is configured to turn on the first booster circuit to boost the power supply voltage when at least one of the following conditions is met:
   the power supply voltage is lower than a first preset voltage threshold; and
   the remaining power is lower than a first preset power threshold,
   wherein the electronic label further comprises a first alarmer,
   wherein the first controller is further configured to send a first alarm instruction to the first alarmer when at least one of the following conditions is met: the power supply voltage is lower than a first preset voltage threshold; and the remaining power is lower than a first preset power threshold;
   wherein the first alarmer is configured to receive the first alarm instruction and output first alarm information;
   wherein
   the first controller is further configured to:
   acquire information of current remaining power and usage status information of the electronic label;
   calculate expected remaining power according to the usage status information and power consumption corresponding to the usage status information;
   compare the current remaining power with the expected remaining power; and
   send a second alarm instruction to the first alarmer when a power difference between the current remaining power and the expected remaining power is greater than a preset power difference threshold; and
   wherein the first alarmer is further configured to receive the second alarm instruction and output second alarm information.

2. The electronic label of claim 1, wherein the usage status information comprises update frequency of the electronic label and service time of the electronic label, and the power consumption corresponding to the usage status information comprises power consumption for update and power consumption per unit time.

3. The electronic label of claim 1, wherein
   the first controller is further configured to send a third alarm instruction to the first alarmer when at least one of the following conditions is met: the power supply voltage is lower than a second preset voltage threshold; and the remaining power is lower than a second preset power threshold;
   the first alarmer is further configured to receive the third alarm instruction and output third alarm information.

4. The electronic label of claim 1, wherein the first booster circuit is a Direct Current (DC) converter booster circuit.

5. An electronic label, comprising:
   a second power supplier, configured to supply power to the electronic label;
   a second controller, configured to monitor at least one of a power supply voltage and a remaining power of the second power supplier; and
   a first transceiver, configured to report at least one of the power supply voltage and the remaining power to an electronic label monitoring device, and receive at least one of a comparison result between the power supply voltage and a third preset voltage threshold and a comparison result between the remaining power and a third preset power threshold,
   wherein the second power supplier comprises a second booster circuit, and the second controller is configured to turn on the second booster circuit to boost the power supply voltage when at least one of the following conditions is met:
   the power supply voltage is lower than the third preset voltage threshold; and
   the remaining power is lower than the third preset power threshold,
   wherein the electronic label further comprises a second alarmer,
   wherein the second controller is further configured to send a fourth alarm instruction to the second alarmer when at least one of the following conditions is met: the power supply voltage is lower than the third preset voltage threshold; and the remaining power is lower than the third preset power threshold;
   wherein the second alarmer is configured to receive the fourth alarm instruction and output fourth alarm information,
   wherein
   the first transceiver is further configured to report usage status information of the electronic label to the electronic label monitoring device and receive a comparison result between current remaining power and expected remaining power of the electronic label;
   the second controller is further configured to send a fifth alarm instruction to the second alarmer when a power difference between the current remaining power and the expected remaining power is greater than a preset power difference threshold; and
   the second alarmer is further configured to receive the fifth alarm instruction and output fifth alarm information.

6. The electronic label of claim 5, wherein the usage status information comprises update frequency of the electronic label and service time of the electronic label, and power consumption corresponding to the usage status information comprises power consumption for update and power consumption per unit time.

7. The electronic label of claim 5, wherein
the first transceiver is further configured to receive at least one of a comparison result between the power supply voltage and a fourth preset voltage threshold and a comparison result between the remaining power and a fourth preset power threshold;
the second controller is further configured to send a sixth alarm instruction to the second alarmer when at least one of the following conditions is met: the power supply voltage is lower than the fourth preset voltage threshold; and, the remaining power is lower than the fourth preset power threshold;
the second alarmer is further configured to receive the sixth alarm instruction and output sixth alarm information.

8. The electronic label of claim 5, wherein the second booster circuit is a Direct Current (DC) converter booster circuit.

9. A method for monitoring power supply for an electronic label, comprising:
monitoring at least one of a power supply voltage and a remaining power of the electronic label;
reporting at least one of the power supply voltage and the remaining power to an electronic label monitoring device;
receiving at least one of a comparison result between the power supply voltage and a third preset voltage threshold and a comparison result between the remaining power and a third preset power threshold; and
boosting the power supply voltage when at least one of the following conditions is met:
the power supply voltage is lower than the third preset voltage threshold; and
the remaining power is lower than the third preset power threshold,
wherein the method further comprises:
outputting fourth alarm information when at least one of the following conditions is met:
the power supply voltage is lower than the third preset voltage threshold; and
the remaining power is lower than the third preset power threshold,
reporting usage status information of the electronic label to the electronic label monitoring device;
receiving a comparison result between current remaining power and expected remaining power of the electronic label; and
outputting fifth alarm information when a power difference between the current remaining power and the expected remaining power is greater than a preset power difference threshold.

10. The method of claim 9, wherein the usage status information comprises update frequency of the electronic label and service time of the electronic label, and power consumption corresponding to the usage status information comprises power consumption for update and power consumption per unit time.

11. The method of claim 9, further comprising:
receiving at least one of a comparison result between the power supply voltage and a fourth preset voltage threshold and a comparison result between the remaining power and a fourth preset power threshold; and
outputting sixth alarm information when at least one of the following conditions is met:
the power supply voltage is lower than the fourth preset voltage threshold; and
the remaining power is lower than the fourth preset power threshold.

12. An electronic label monitoring device, comprising:
a second transceiver, configured to receive at least one of a power supply voltage and a remaining power of an electronic label, and send at least one of a comparison result between the power supply voltage and a third preset voltage threshold and a comparison result between the remaining power and a third preset power threshold to the electronic label; and
a third controller, configured to call at least one of the third preset voltage threshold and the third preset power threshold, and compare at least one of the following two sets of values to obtain the comparison result: between the power supply voltage and the third preset voltage threshold, and between the remaining power and the third preset power threshold,
wherein
the second transceiver is further configured to receive usage status information of the electronic label and send a comparison result between current remaining power and expected remaining power to the electronic label;
the third controller is further configured to calculate the expected remaining power according to the usage status information of the electronic label and a power consumption corresponding to the usage status information, and to compare the current remaining power with the expected remaining power to obtain the comparison result.

13. The device of claim 12, wherein the usage status information comprises update frequency of the electronic label and service time of the electronic label, and the power consumption corresponding to the usage status information comprises power consumption for update and power consumption per unit time.

14. The device of claim 12, wherein,
the third controller is further configured to call at least one of a fourth preset voltage threshold and a fourth preset power threshold, and compare at least one of the following two sets of values to obtain a comparison result: between the power supply voltage and the fourth preset voltage threshold, and between the remaining power and the fourth preset power threshold;
the second transceiver is further configured to send at least one of the comparison result between the power supply voltage and the fourth preset voltage threshold and the comparison result between the remaining power and the fourth preset power threshold to the electronic label.

* * * * *